Dec. 24, 1968  R. T. SECREST  3,417,929

COMMINUTING PUMPS

Filed Feb. 8, 1966  3 Sheets-Sheet 1

INVENTOR.
RALPH T. SECREST
BY Eugene M. Eckelman
ATTORNEY

Dec. 24, 1968   R. T. SECREST   3,417,929
COMMINUTING PUMPS

Filed Feb. 8, 1966   3 Sheets-Sheet 2

INVENTOR.
RALPH T. SECREST
BY Eugene M. Eckelman
ATTORNEY

Dec. 24, 1968 R. T. SECREST 3,417,929
COMMINUTING PUMPS
Filed Feb. 8, 1966 3 Sheets-Sheet 3
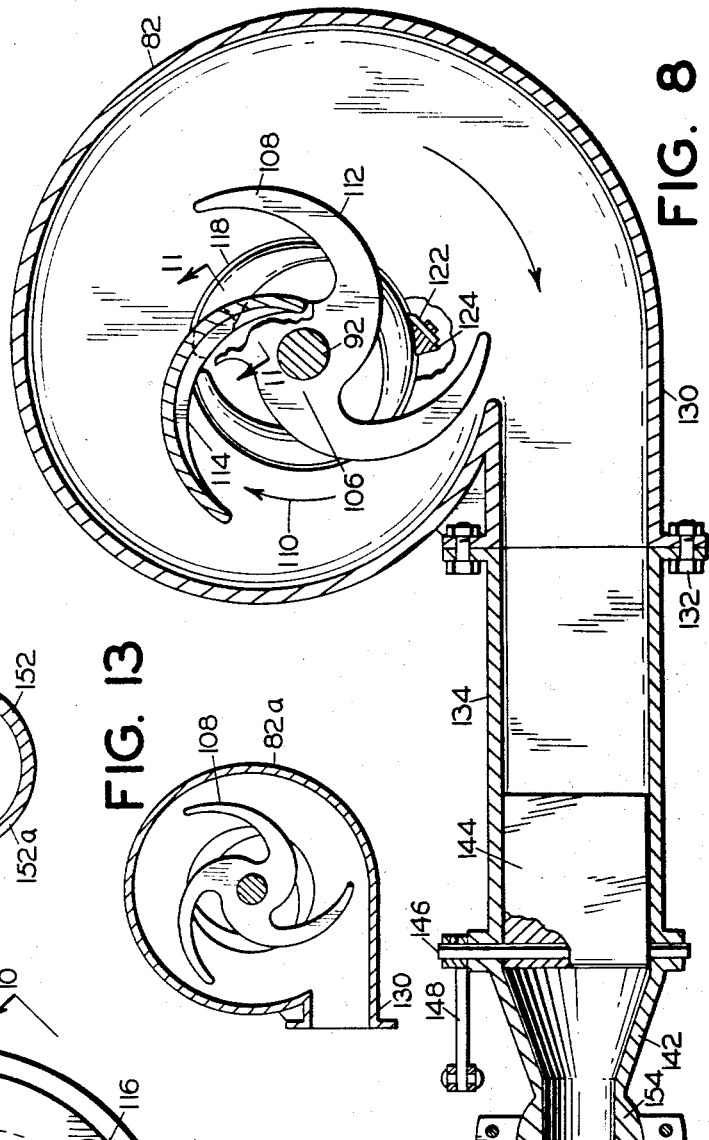
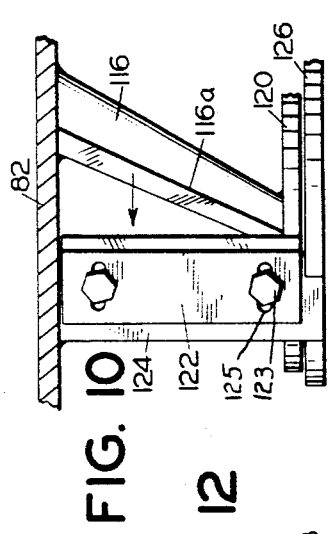
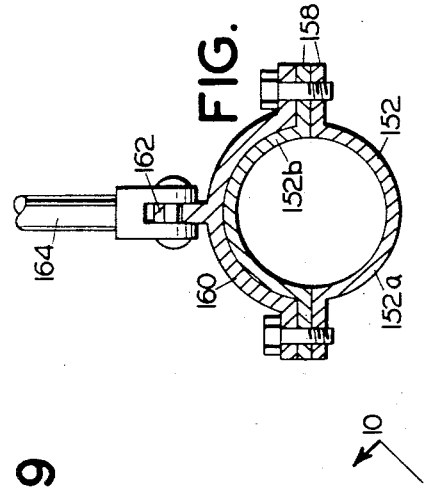
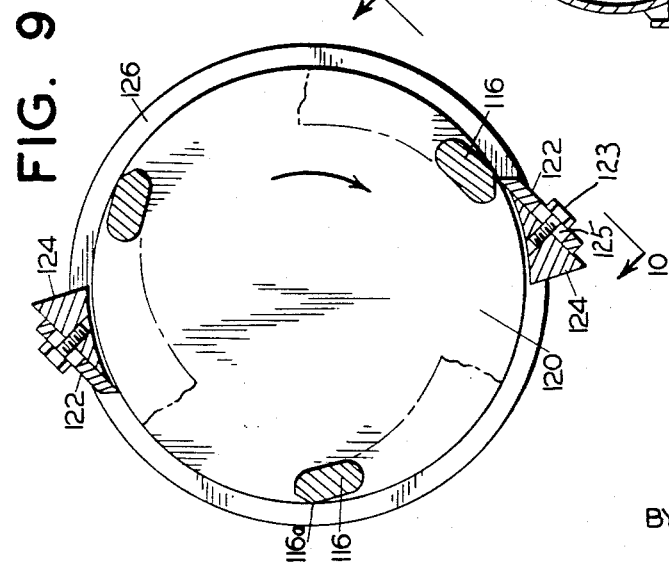
INVENTOR.
RALPH T. SECREST
BY Eugene M. Eckelman
ATTORNEY

United States Patent Office 3,417,929
Patented Dec. 24, 1968

3,417,929
COMMINUTING PUMPS
Ralph T. Secrest, Elma, Wash., assignor to Secrest Manufacturing Company, Bellevue, Wash., a corporation of Washington
Continuation-in-part of application Ser. No. 454,353, May 10, 1965. This application Feb. 8, 1966, Ser. No. 534,268
7 Claims. (Cl. 241—46.04)

ABSTRACT OF THE DISCLOSURE

The pump is supported in suspended relation in a tank and is driven by a motor supported on the tank. Rotatably supported in the pump housing is an impeller assembly including pumping blades and depending cutter blades. Shear blades also depend from the pump housing and are engaged by the cutter blades for comminuting material to be pumped. The pump has a first outlet in the form of a vertical pipe extending through the top of the tank and a second outlet terminating within the tank. The valve is included in the outlet for directing the pump outflow either through the vertical outlet or the outlet within the tank. The entire pump assembly is vertically adjustable by a lift apparatus.

---

This application is a continuation-in-part of application Ser. No. 454,353 filed May 10, 1965, now abandoned, for Improvements in Comminuting Pumps.

The invention relates to new and useful improvements in pump structures and more particularly is concerned with mechanism adapted simultaneously to pump a liquified mass and to reduce any coarse material in the mass to a fine state. One form of such pump is shown and described in my Patent No. 3,185,100 for Comminuting Pump.

It is a primary objective of the present invention to provide a pump which, due to its novel structure, is efficient in operation for the pumping of a liquified mass and for reducing coarse material in the mass to a fine state.

Additional objects of the present invention are to provide a pump having improved structure facilitating vertically adjustable suspension thereof into a liquified mass to be pumped and reduced; to provide a pump employing a novel impeller assembly which combines cutter and pumping blades in one integrated unit; to provide a pump which has the inlet and outlet thereof spaced apart in a direction parallel to the axis of the impeller; to provide a pump which has a horizontal inlet and a horizontal outlet, the inlet extending around substantially the full peripheral dimension of the housing; to provide in one embodiment of the pump a cutter and pumping blade assembly which is screw shaped in the area of an inlet opening and has an expelling surface extending parallel to the axis of the impeller in the area of the outlet opening; to provide in another embodiment a cutter and pumping blade assembly wherein a pumping portion thereof is enlarged relative to the cutter portion; and to provide novel agitating means associated with an outlet portion of the pump to agitate or mix material prior to pumping.

Another object is to provide a pump of the type described which is simple in structure and inexpensive to manufacture.

Briefly stated, the present pump is adapted to be suspended or otherwise supported in a tank or the like containing a liquified mass to be pumped, and is particularly useful for the simultaneous pumping and reduction of coarse material carried in a liquid. More particularly, this pump includes a housing in which is incorporated novel cutter and pumping blades and a novel disposition of inlet and outlet openings whereby to accomplish efficient pumping and cutting.

The invention will be better understood and additional objects will become apparent from the following specification and claims, considered together with the accompanying drawings wherein the numerals of reference indicate like parts.

In the drawings:

FIGURE 8 is an enlarged, horizontal, sectional view taken on the line 8—8 of FIGURE 6;

FIGURE 9 is an enlarged, fragmentary, horizontal, sectional view taken on the line 9—9 of FIGURE 6;

FIGURE 10 is an enlarged, fragmentary, elevational view taken on the line 10—10 of FIGURE 9;

FIGURE 12 is an enlarged, vertical, sectional view taken on the line 12—12 of FIGURE 6; and FIGURE 13 is a view taken on a similar line as FIGURE 8 but in reduced size and showing a modified form of pumping chamber.

Figure 1:
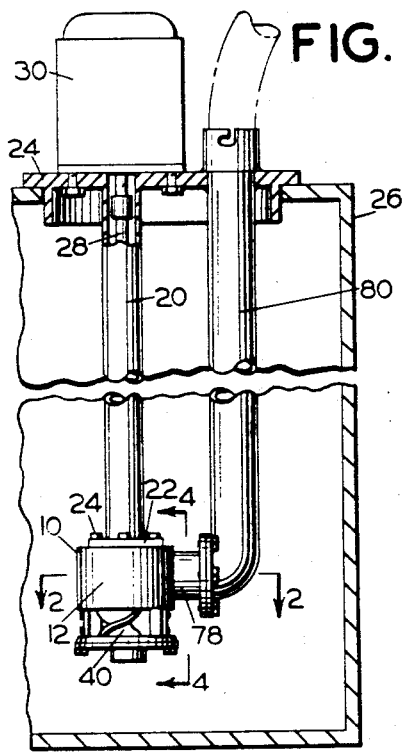
FIGURE 1 is a side elevational view of a first form of the present pump installed in a tank for pumping, and also showing drive means, partly broken away, for the pump.

The present pump has as one important use thereof the transferring of a liquified mass from a storage tank or the like to another place and at the same time reducing or comminuting any coarse material which may be in the liquid. For example, it is now common on farms to bury manure disposal tanks in the ground for storage of the manure. Such manure is mixed with a liquid, and as needed, it is transferred from the tank to the field by pump means. This product most often contains straw or other bedding material which is difficult to pump and which is impractical without comminution to spread it on the ground through the medium of liquid spreader means. The present pump is designed to prepare such liquified material for spreading but of course it may also be used for the pumping and cutting of various other substances.

Referring particularly to the drawings, a first embodiment of the present pump is shown in FIGURES 1 through 5 and comprises a pump housing or casing 10 having a cylindrical side wall portion 12, a top wall 14, and a bottom wall 16. The bottom wall 16 is removably attached to the housing 10 in order to gain access to the interior of the housing, and for this purpose said bottom wall is secured to the bottom edge of the housing by studs 18. The pump housing is adapted to be supported in suspended relation in a tank or the like by means of a vertical hollow extension 20 such as a pipe section. The hollow extension 20 has a bottom flange 22 for receiving studs 24 or the like for securement of the said extension to the housing. The extension 20 is integrated at its upper end with a motor support plate 24 removably supported on the top wall of a storage tank 26 into which the pump is suspended.

Leading through the hollow extension 20 is a shaft 28 driven by a motor 30 supported on the plate 24. This shaft projects through an aperture 32 in the top wall 14 of the pump housing and extends the full height of the housing and has journaled support at its bottom in an anti-friction bearing 34 seated in a socket 36 in the bottom wall 16 of the housing. Bearing means 38 are provided in the lower end of hollow extension 20 for journaled engagement by the shaft 28.

Figure 2:
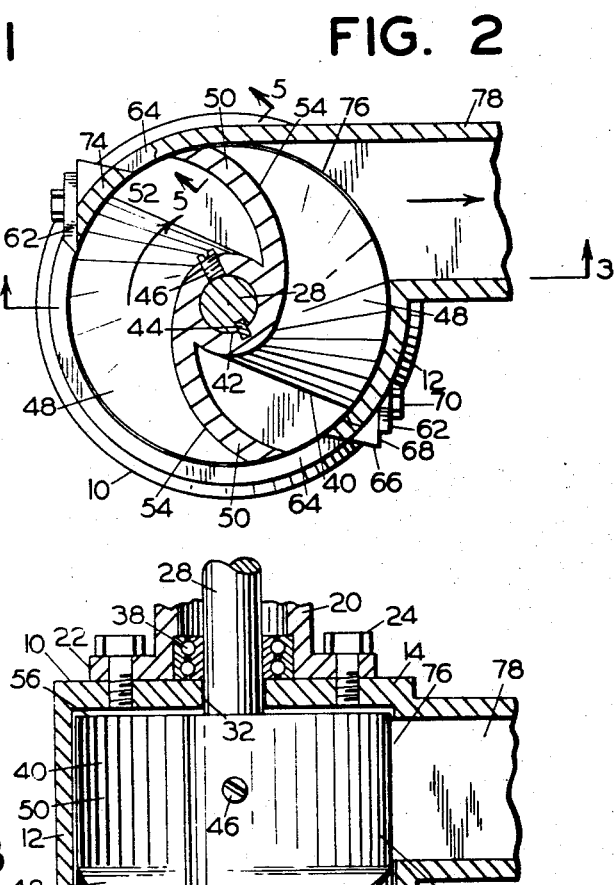
FIGURE 2 is an enlarged, horizontal, sectional view, partly broken away, of the pump of FIGURE 1, taken on the line 2—2 of FIGURE 1.

Contained within the housing 10 is an impeller assembly 40 having a central bore 42, FIGURE 2, for receiving the shaft 28. A positive connection between the shaft and the impeller assembly is accomplished by key means 44 and one or more set screws 46.

Figure 3:
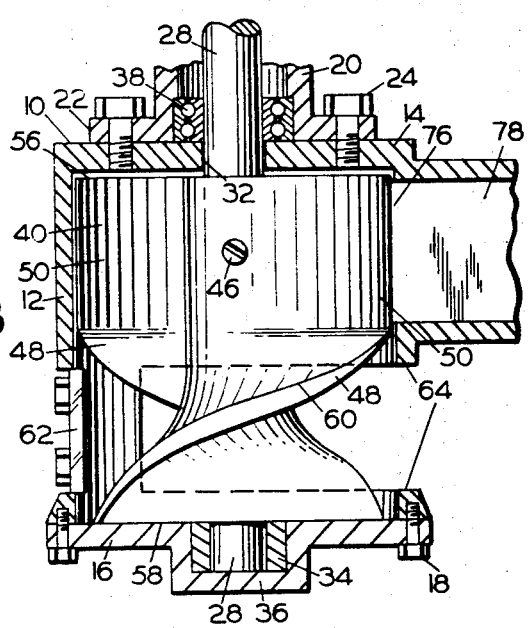
FIGURE 3 is a vertical sectional view taken on the line 3—3 of FIGURE 2.
Figure 4:
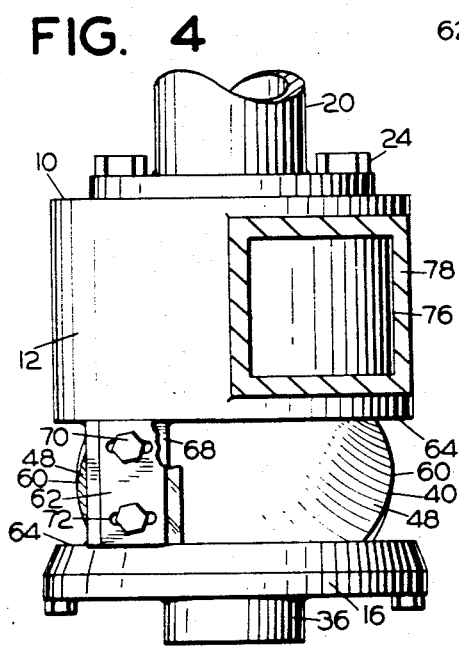
FIGURE 4 is a vertical sectional view taken on the line 4—4 of FIGURE 1.
Figure 5:
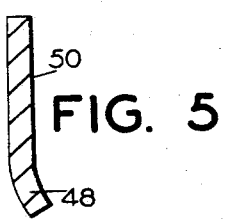
FIGURE 5 is a vertical, fragmentary, sectional view taken on the line 5—5 of FIGURE 2.

As best seen in FIGURES 2 and 3, the impeller assembly includes a pair of cutter and pumping blades 48 which at the lower portion thereof are screw or auger shaped and at the upper portion thereof comprise vertically extending plate portions 50 which as will be seen comprise expelling or discharging portions of the impeller assembly. While the plate portions 50 are parallel to the axis of the impeller assembly and therefore straight walled in this direction, FIGURE 5, they are laterally curved in a convexo-concave configuration, FIGURE 2. The plate portions 50 are constructed such that the leading surfaces 54 thereof are the convex surfaces. These surfaces therefore comprise the convex portion. The upper and lower edges 56 and 58, respectively, of the impeller assembly comprise straight edges extending in a plane normal to the axis of the shaft 28 and are in close association with respective top and bottom inner wall surfaces of the housing in order that the coarse material in the liquid will be confined between the blades 48.

The outer edges of the blades 48 in the lower or screw portion thereof comprise cutting edges 60, and associated with these cutting edges are shear plates 62 secured to the housing. More particularly, the lower portion of the housing has a pair of inlet openings 64, and a shear plate 62 is mounted vertically on the far edge of these openings as concerning the direction of rotation of the impeller. The shear plates 62 are secured on housing projections 66 having a supporting surface 68 to which the shear plates are secured as by studs 70. In assembled relation, the cutting edges 60 of the cutter and pumping blades 48 operate in close tolerance to the shear plates 62 whereby any material which may move with the liquid through the inlet openings 64 will be comminuted or reduced. For the purpose of selectively setting or changing the spacing between the cutting edges 60 of the impeller blades and the shear plates 62, the latter have laterally extending, elongated slots 72 which receive the studs 70 and permit lateral adjustment of the plates.

Each of the inlet openings 64 is greatly elongated and each extends almost around one-half the periphery of the side wall 12 of the housing, these openings being separated only by short lengths of housing wall portions 74. Thus, the inlet opening of the pump housing extends around substantially the full peripheral dimension thereof. Furthermore, it will be noted that the entire inlet for the pump is a lateral or side directed opening, or in the normal operation of the pump be said to comprise a horizontal opening.

Pump housing 10 is provided with an outlet opening 76 also in the side wall 12 but spaced upwardly from the inlet openings or more specifically spaced from the inlet openings in a direction parallel to the axis of the impeller assembly. As seen in FIGURE 2, the outlet opening 76 is of considerably smaller peripheral dimension than the combined peripheral dimension of the inlet openings. Leading from the outlet openings 76 is an outlet pipe or spout 78 connected to an upwardly directed discharge pipe 80. In a preferred construction the outlet pipe 78 has a rectangular construction in order to minimize the size of the outlet opening 76 but yet to provide a maximum outflow therefrom.

The particular structure of pump described has been found to contribute to great efficiency and smooth operation in the pumping and comminution of coarse material in liquid suspension. With the pump housing suspended in the liquified mass, the screw shaped impeller blades draw in the material and grind any coarse material therein. As the blades 48 pass the inlet openings the vacuum created on the trailing sides thereof serves to draw the material into the inlet openings and the following blade picks up the liquified mass, grinds any coarse material between the cutting edges 60 and shear plates 62, and then forces the material upwardly into the area of the curved, expelling plate portions 50. The plate portions 50, being of widened surface and extending in a direction parallel to the axis of the impeller, forcefully and quickly eject the treated mass out through outlet pipe 78. The efficient operation of the present pump results from a smooth and gradual movement of the spiral portions of the blades 48 into engagement with the liquified mass for transferring it toward the plate portions 50 and then by the immediate discharge thereof by the plate portions 50. It is preferred that the lead of the blades 48 be extended, as shown, whereby to provide smooth engagement of the blades with the liquified mass as mentioned.

FIGURES 6 through 12 show a second embodiment of pump utilizing principles of the present invention. This embodiment comprises a pump housing or casing 82, FIGURES 6 and 7, adapted to be supported in suspended relation in a tank 26 or the like by means of a vertical, hollow extension 84 such as a pipe section. Hollow extension 84 has a bottom flange 86 for receiving studs 88 to secure the said extension to the housing 82. The extension 84 is integrated at its upper end with a motor support plate 89 seated freely on a top plate 90 of the tank 26 into which the pump is suspended, the extension 84 passing freely through suitable aperture means in the top plate 90.

Leading through the hollow extension 84 is a shaft 92 driven by any suitable drive means 94 such as an electric motor secured on the plate 89. As viewed in FIGURE 7, shaft 92 is journaled in bearings 96 in the extension 84, and for the purpose of assembly and maintenance comprises upper and lower lengths 92a and 92b, respectively, connected together by a key connection 98. Also, as viewed in FIGURES 6 and 7, the hollow extension 84 is jointed, having an upper length 84a and a lower length 84b, these two portions being detachably connected by a flanged joint 100.

Shaft 92 projects into housing 82 and has integral connection with an impeller assembly 104. Impeller assembly 104 comprises a pumping portion which is contained in the housing 82 and which has an upper body or plate portion 106, FIGURES 7 and 8, integrated with the shaft 92. Leading outwardly from the body portion 106 and disposed in vertical relation are pump blades 108. These pump blades, as best seen in FIGURE 8, assume a convexo-concave configuration. The pump is driven in the direction of arrow 110 whereby the leading surfaces 112 of the blades comprise the convex surfaces. The lower ends of blades 108 have horizontal reinforcing flanges 114.

Figure 11:
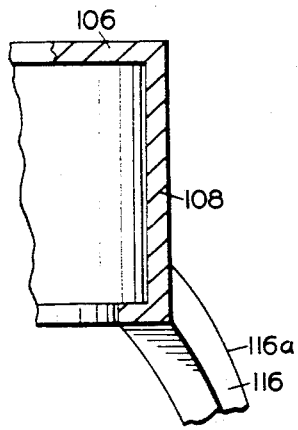
FIGURE 11 is an enlarged, fragmentary, sectional view taken on the line 11—11 of FIGURE 8.
Figure 7:
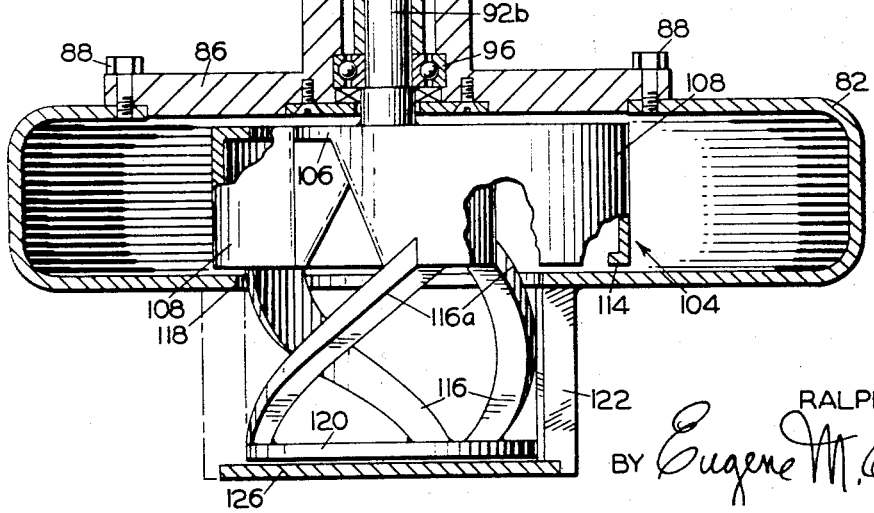
FIGURE 7 is an enlarged, vertical sectional view taken on the line 7—7 of FIGURE 6.

Secured to the lower end of each pump blade 108 is a bar-like cutter blade or bar 116, also seen in FIGURES 9, 10, and 11, these cutter blades depending downwardly through an aperture 118 in the pump housing 82 in substantially a vertical plane but having a forward leading curvature as apparent in FIGURES 7 and 8. Cutter blades 116 are secured in any suitable manner to the pump blades, such as by welding or by casting as an integral unit therewith, and such securement is at a point intermediate the inner and outer ends of said pump blades whereby the diametral dimension of the cutter blade assembly is substantially less than the diametral dimension of the pump blade assembly for a purpose to be described.

Cutter blades 116 are secured at their lower ends to a disc-like connecting plate 120 to form an integral, rugged structure, and are associated with a pair of shear plates 122, best seen in FIGURES 8, 9 and 10, each mounted adjustably on depending housing portions 124 integrated at their lower ends with a bottom plate 126. Adjustable mounting of the shear plates 122 is accomplished by headed schrews 123 threadedly engaged in the housing portions 124 and passing through elongated slots 125 in the plates 122. The arrangement is such that cutting edges 116a of the cutter blades 116 operate in close tolerance with the shear plates 122 whereby any coarse material which is in the liquid being pumped will be comminuted or reduced. It is apparent that the entire area, with the exception of the area taken up by depending housing portions 124 and the shear plates 122, comprises an inlet for the pump, such inlet comprising a lateral or side opening horizontal inlet. The connecting plate 120 on the bottom of the cutter blades 116 may be omitted if desired since it is possible that said blades could have free depending relation and not connected at the bottom.

As best seen in FIGURE 8, the pump housing 82 is of volute shape and has an outlet 130. With the pump housing 82 suspended in a liquified mass, the pump blades operating in the housing draw the liquified mass into the cutter blade area and discharge the material through the outlet 130. As the liquified mass flows through the cutter blade area any coarse material therein is comminuted. The arrangement of pump blades and cutter blades provides for an efficient pumping action in that the material being pumped flows upwardly between the cutter blades 116 for efficient engagement by the pumping blades. It has also been found that the enlarged pumping area with relation to the smaller cutting area contributes to the efficient output of the pump.

Figure 6:
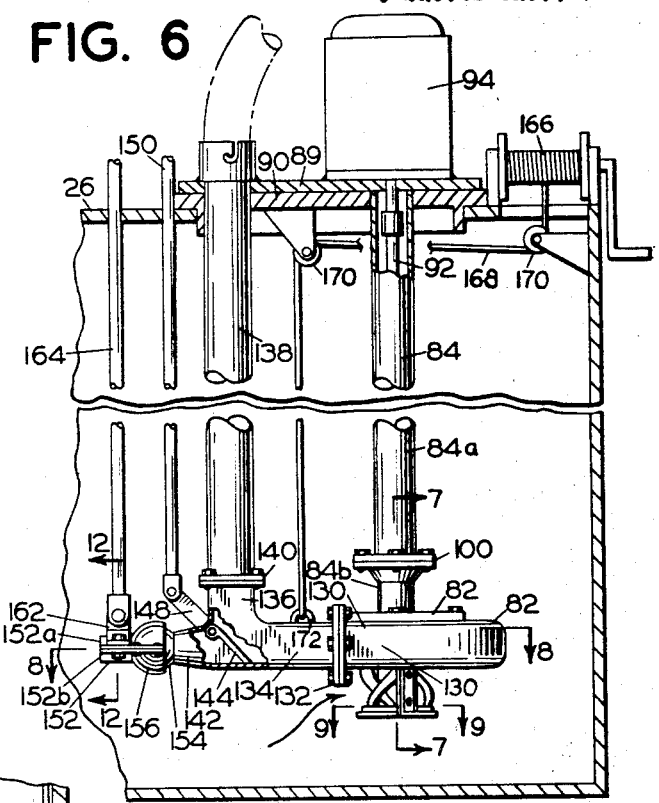
FIGURE 6 is a side elevational view, partly broken away, of a second form of the present pump installed in a tank.

Connected to the outlet 130 of the pump, as by a flanged connection 132, FIGURE 6, is an outlet fitting or housing 134 having a first outlet portion 136, FIGURE 6, directed upwardly and connected to a discharge pipe 138 by means of a flanged connection. Discharge pipe 138 passes freely through aperture means in the plate 90 and is secured to the motor support plate 89.

Outlet fitting 134 has a second outlet portion 142, also seen in FIGURE 8, directed horizontally and provided with a valve 144 which is rotatable between two limit positions. A first limit position of the valve comprises a downwardly angled position against the floor of fitting 134, as shown in FIGURE 6, to direct the output of the pump upwardly through the discharge pipe 138, and a second limit position of the valve comprises an upper position against the top of the fitting to direct the output through the second outlet portion 142. Valve 144 is pivotally mounted on a laterally disposed cross pin 146 at the juncture point between the first and second outlet portions 136 and 142, respectively. The valve 144 is secured to the pin 146 in any suitable manner for rotation therewith, and such pin projects beyond one side of the fitting 134 for connection to a valve operating lever 148. Lever 148 is pivotally connected to an upwardly directed rod 150 projecting freely through aperture means in the top of the tank and operable vertically to control the position of valve 144.

Outlet portion 142 has an adjustable nozzle 152 mounted thereon. Such adjustable connection comprises a ball-type enlargement 154 on the outlet portion 142 and a socket-type enlargement 156 on the nozzle 152 rotatably fitted on the enlargement 154. For the purpose of assembly, the nozzle 152 and its enlargement 156 may comprise two parts 152a and 152b FIGURE 12, each having flanges 158 which may be bolted together, FIGURES 6, 8 and 12. With particular reference to FIGURE 12, there is bolted to the flanges 158 forwardly of the socket enlargement 156 a bracket 160 having an upwardly directed ear 162 pivotally connected to an upwardly directed operating rod 164. It is apparent that the nozzle 152 has universal movement on the fitting 142 and by suitable manipulation of the operating rod 164 such nozzle may be positioned in any suitable direction, the operating rod 164 projecting freely through suitable aperture means in the top wall of the tank.

In the normal operation of the pump for discharging contents of the tank, the valve 144 is positioned as shown in FIGURE 6 whereby the output of the pump is ejected through the discharge pipe 138. If it is desired to agitate the contents of the tank the valve 144 is moved to its other limit position to close off the discharge pipe 138 whereby the output of the pump is ejected through the nozzle 152 to cause an agitation of material in the tank. The valve may be adjusted to any position intermediate its limit positions for causing both discharge of material through the pipe 138 and through the nozzle 152. For the purposes of agitating the contents of the tank it is apparent that the nozzle may be moved to any adjusted position by vertical and rotatable movement of its operating rod 164.

It is to be understood that nozzle 152 may assume various constructions, and the ball and socket type connection between said nozzle and the outlet portion 142 is illustrative only. Furthermore, it is to be understood that the outlet 142 and the nozzle may assume any selected size, depending upon the outlet capacity desired.

Since the extension 84, discharge pipe 138 and operating rods 150 and 164 project freely through the top wall of the tank, the entire pump assembly can be raised or lowered in the tank. Means are provided for raising or lowering such pump assembly which comprises a winch 166 mounted on the top of the tank and arranged to operate a line 168 extending into the tank. The line 168 is reeved over suitable pulleys 170 and its free end connected to the pump housing by eye means 172. Although winch means are illustrated for adjusting the pump assembly vertically, it is to be understood that other means may be employed.

FIGURE 13 shows a modified form of pump housing 82a wherein the pump chamber is of non-volute configuration.

By means of the present invention an efficient pump is provided which simultaneously pumps and comminutes a liquified mass. In the embodiments illustrated, the liquified mass is drawn through a lower inlet cutter blade portion and ejected through an upper outlet, the inlet and outlet openings comprising side openings but spaced vertically from each other. The liquified mass is drawn upwardly in the area between the cutter blades to facilitate efficient pump output, and as stated before, the reduced size of the cutter portion relative to the size of the pumping portion in the embodiment of FIGURES 6–12 has been found to contribute greatly to the efficiency of the pump.

It is understood that the forms of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A comminuting pump comprising a pump housing, means in said housing forming a pump chamber, means for suspending said housing in a liquified mass in a tnak, an impeller assembly rotatably supported in said housing, pumping blades on said impeller assembly, means for rotatably driving said impeller assembly, cutter blades depending from said impeller assembly, said cutter blades having cutting edges, depending shear means cooperating with said cutting edges to comminute material being drawn upwardly into said pump chamber by said pumping blades, means mounting said shear means on said housing for adjustable positioning of said shear means toward and away from said blades, means in said housing defining an inlet opening adjacent to and horizontally aligned with said shear means, and means in said housing defining an outlet adjacent to said pumping blades.

2. The comminuting pump of claim 1 wherein the inlet opening extends around substantially the full peripheral dimension of said cutter blades and is spaced from said outlet opening in a direction parallel to the axis of said impeller.

3. The comminuting pump of claim 1 wherein said inlet opening extends at least around a third of the circumference of the full peripheral dimension of said cutter blades.

4. The comminuting pump of claim 1 including in combination a tank for holding a liquified mass, said tank having defining walls including a top wall, said suspending means including an upright support for said pump housing, said upright support slidably projecting through the top wall of said tank, and lift means connected to said pump housing for adjusting the same vertically in the tank.

5. The comminuting pump of claim 1 wherein said pump housing and said suspending means are constructed and arranged for vertical adjustable movement in a tank, and lift means connected to said pump housing and said suspending means for adjusting the same vertically in the tank.

6. A comminuting pump comprising a pump housing forming a pump chamber, means for suspending said housing in a liquified mass, an impeller assembly having pumping blades in said chamber, means for rotatably driving said impeller assembly, cutter blades depending from said pumping blades, said cutter blades having cutting edges, shear means on said housing cooperating with said cutting edges to comminute material being drawn upwardly thereinto by said pumping blades, means in said housing defining an inlet and an outlet providing horizontal intake and outlet of material being pumped, said outlet comprising first and second outlet portions, diverting means in said outlet for directing the output of the pump through either said first or second outlet portion, and nozzle means on one of said first and second outlet portions, said nozzle means being adjustable for directing the output from said pump in different places.

7. The comminuting pump of claim 6 wherein said nozzle means is mounted on said second outlet portion and is adjustably mounted thereon for directing the output from said pump in various directions.

References Cited

UNITED STATES PATENTS

| | | | |
|---|---|---|---|
| 2,416,043 | 2/1947 | Bucher-Guyer | 241—246 X |
| 2,712,905 | 7/1955 | Sandor | 241—101 |
| 2,866,555 | 12/1958 | Nordell | 210—67 |
| 2,963,281 | 12/1960 | Reiffen | 241—258 X |
| 3,155,330 | 11/1964 | Holz et al. | 241—258 |
| 3,318,248 | 5/1967 | Rembold | 241—46 X |
| 3,330,488 | 7/1967 | Muller | 241—258 X |

FOREIGN PATENTS 960,112   10/1949   France.

ANDREW R. JUHASZ, *Primary Examiner.*

FRANK T. YOST, *Assistant Examiner.*

U.S. Cl. X.R.

241—101, 246, 258